US010397008B2

(12) United States Patent
Baentsch et al.

(10) Patent No.: US 10,397,008 B2
(45) Date of Patent: Aug. 27, 2019

(54) MANAGEMENT OF SECRET DATA ITEMS USED FOR SERVER AUTHENTICATION

(71) Applicant: International Business Machines Corporation, Armonk, NY (US)

(72) Inventors: Michael Baentsch, Rueschlikon (CH); Harold Dykeman, Richterswil (CH); Michael Osborne, Richterswil (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/004,091

(22) Filed: Jun. 8, 2018

(65) Prior Publication Data

US 2018/0294980 A1    Oct. 11, 2018

Related U.S. Application Data

(63) Continuation of application No. 13/036,445, filed on Feb. 28, 2011, now Pat. No. 9,998,288.

(30) Foreign Application Priority Data

Feb. 26, 2010    (EP) .................................... 10154908

(51) Int. Cl.
*H04L 29/06*    (2006.01)
*H04L 9/32*    (2006.01)
(Continued)

(52) U.S. Cl.
CPC .......... *H04L 9/3273* (2013.01); *G06F 21/445* (2013.01); *H04L 9/0897* (2013.01);
(Continued)

(58) Field of Classification Search
CPC . H04L 9/0897; H04L 2209/76; H04L 9/3273; H04L 63/0853; H04L 63/0884; H04L 63/0428; G06F 21/445
See application file for complete search history.

(56) References Cited

U.S. PATENT DOCUMENTS 5,495,533 A    2/1996    Linehan et al.
2004/0230812 A1    11/2004    Muller et al.
(Continued)

OTHER PUBLICATIONS

Weigold, "The Zurich Trusted Information Channel—An Efficient Defence Against Man-in-the-Middle . . . " 2008, IBM Zurich Research Lab, pp. 75-91, 2008.

*Primary Examiner* — Amir Mehrmanesh
(74) *Attorney, Agent, or Firm* — Steven M. Greenberg, Esq.; Shutts & Bowen LLP

(57) ABSTRACT

A security device (6) is provided for facilitating management of secret data items such as cryptographic keys which are used by a remote server (2) to authenticate operations of the server (2). The device (6) has a user interface (13), control logic (16) and a computer interface (11) for connecting the device (6) to a local user computer (5) for communication with the remote server (2) via a data communications network (3). The control logic is adapted to establish via the user computer (5) a mutually-authenticated connection for encrypted end-to-end communications between the device (6) and server (2). In a backup operation, the secret data items are received from the server (2) via this connection. The control logic interacts with the user via the user interface (13) to obtain user authorization to backup secret data items and, in response, stores the secret data items in memory (10). To restore secret data items to the server, the control logic interacts with the user via the user interface (13) to obtain user authorization to restore secret
(Continued)

data items and, in response, sends the secret data items to the server (2) via said connection.

9 Claims, 3 Drawing Sheets

(51) Int. Cl.
*G06F 21/44* (2013.01)
*H04L 9/08* (2006.01)
(52) U.S. Cl.
CPC ...... *H04L 63/0853* (2013.01); *H04L 63/0884* (2013.01); *H04L 63/0428* (2013.01); *H04L 2209/76* (2013.01)

(56) References Cited

U.S. PATENT DOCUMENTS

| | | | |
|---|---|---|---|
| 2007/0289003 A1 | 12/2007 | Hamid et al. | |
| 2008/0080396 A1* | 4/2008 | Meijer | H04L 12/66 370/254 |
| 2009/0204964 A1* | 8/2009 | Foley | G06F 21/53 718/1 |
| 2014/0108792 A1* | 4/2014 | Borzycki | G06F 21/6218 713/165 |

* cited by examiner

MANAGEMENT OF SECRET DATA ITEMS USED FOR SERVER AUTHENTICATION

CROSS-REFERENCE TO RELATED APPLICATIONS

This application is a Continuation of U.S. patent application Ser. No. 13/036,445, filed on Feb. 28, 2011, which claims priority to European Patent Application No. 10154908.7, filed on Feb. 26, 2010, each of which is incorporated herein by reference in their entirety.

FIELD OF THE INVENTION

This invention relates generally to management of secret data items which are used by a remote server to authenticate server operations. Devices are provided for facilitating management of such secret data items over data communications networks, together with apparatus and systems employing such devices and computer programs for controlling operation of such devices.

BACKGROUND OF THE INVENTION

The term "server" is used herein in the most general sense and includes any computer or system providing some service or functionality to connecting users. When security-sensitive operations are performed by servers in data communications networks, secret data items such as cryptographic keys, passwords or other security tokens can be used by a server to authenticate operations performed by the server, i.e. to prove that the operation is performed by an authentic or authorised server. By way of example, when providing security-sensitive services to connecting users over a network, for instance banking services conducted over the Internet, it is important that communications from the server can be authenticated by recipients. An access request by a server to a restricted resource, such as a connected database, may also require authentication for example. Authentication can be achieved by the server demonstrating knowledge of a secret data item in a manner which can be verified by the other party to the operation. Such a data item is "secret" in the sense that is not known to unauthorized parties and may be secret to the server alone or to the server and a limited set of one or more authorized parties. A typical server will hold many such secret data items, e.g. for use by different applications running on the server and/or for use with different connecting parties. A banking server, for instance, will typically hold multiple private keys (i.e. the secret keys of asymmetric, public-private key-pairs) for use in its various secure operations.

Secret data items such as private server keys require management by system administrators. In particular, administrators need to backup server keys so that these can be restored to the server if necessary. For example, keys can be lost due to device failure, or due to scheduled system overhauls, and must be returned to the server to restore normal operation. Often, system administrators simply backup server keys to a file on a workstation or personal computer (PC). More security-minded administrators might store the backup file on an encrypted disc for example. In general, however, the backup process can represent a security weak-point in an otherwise secure system.

A copending patent application publication (WO2009/066217) discloses a device for improving security in electronic transactions conducted between a user PC and a remote server over a data communications network. This device is also described in "The Zurich Trusted Information Channel—An Efficient Defence against Man-in-the-Middle and Malicious Software Attacks", Thomas Weigold et al., in P. Lipp, A.-R. Sadeghi, and K.-M. Koch (Eds.): TRUST 2008, LNCS 4968, pp. 75-91, Springer-Verlag Berlin Heidelberg 2008. The device can be connected to a user PC and sets up a secure, mutually-authenticated end-to-end connection with the server with the aid of a proxy application on the user PC which prompts the resident web browser to connect to a specific bank URL (universal resource locator). The ensuing browser session is then conducted via the secure connection and monitored by the security device. If the device detects security-sensitive information such as bank transaction details, these are displayed on the device and the user can press a button to indicate his confirmation. Only if the security device receives this confirmation will it maintain the connection and forward the transaction request to the server. This device thus allows a user to verify critical transaction details and authorize the transaction independently of the user PC.

SUMMARY OF THE INVENTION

One aspect of the present invention provides a security device for facilitating management of secret data items used by a remote server to authenticate operations of the server. The device includes a computer interface for connecting the device to a local user computer for communication with the remote server via a data communications network, a user interface, and control logic. The control logic is adapted to establish between the device and remote server, via the user computer, a mutually-authenticated connection for encrypted end-to-end communications between the device and server, to receive the secret data items from the server via the connection, to interact with the user via the user interface—to obtain user authorization to backup secret data items and, in response, to store the secret data items in memory accessible to the control logic in use and to interact with the user via the user interface to obtain user authorization to restore secret data items and, in response, to send the secret data items to the server via the connection.

Security devices embodying aspects of the invention provide a secure backup and restoration mechanism for secret data items, such as server keys, used for authentication by a remote server. A user can simply connect the device to a local user computer which can connect to the server over a communications network, and secure backup and restoration of server keys is then possible, even via a potentially compromised user computer and over a potentially insecure network. The device control logic requires user authorization for the backup and restores operations through interaction with the user via the user interface of the device. Authorization cannot therefore be "mimicked" illegally from a user computer, e.g. by malware on a compromised user PC. When performing a backup or restore operation, the server keys are sent over a secure channel provided by a mutually-authenticated, encrypted connection which is end-to-end between the device and server. Hence, server keys sent over this connection cannot be "read" by the user computer even though this computer lies in the communications path.

However, to facilitate key management processes, functionality of the user computer can still be exploited as discussed below, with necessary user authorization being provided via the device for security. On receipt of user authorisation via the device, server keys received over the secure connection are stored by the control logic for backup purposes. These can be subsequently returned to the server, again in response to user authorization, when restoration is required. Hence, in contrast to the prior device discussed above which simply enables user authorisation of a current transaction, security devices embodying this invention exploit the independent user-authorization facility to provide secure backup and restoration of remote server keys or similar secret data items used for server authentication.

The security device may be connectable via its computer interface to a local user computer in the form of a PC or workstation, though in general a user computer to which the device can be connected may be some other form of user computing device, such as a PDA (personal digital assistant) or mobile phone for example, which can connect to the remote server via a data communications network. Since security is imposed by the device operation, the user may simply connect the device to any convenient computer at his current location to perform the backup and restore operations. When connected to the local user computer, the user can then interface with both the security device and the user computer and this can be exploited to facilitate remote key management operations. In particular, the control logic of preferred embodiments is adapted, during connection of the device to the user computer, to communicate with client software running on the user computer such that user input to the user computer for management of the secret data items can be conveyed to the server via the security device, and information sent by the server for management of the secret data items can be conveyed via the security device to the user computer for output to the user. The majority of user interactions can then be performed using the user interface functionality of the connected computer, with user interaction via the security device user interface being performed when necessary for authorising backup and restore operations. In particularly preferred embodiments, the client software simply comprises a conventional web browser application on the local user computer, and a proxy application for conveying communications between the browser and the server via the security device. Such a proxy application can conveniently be loaded to the user computer from the security device when the security device is connected to the user computer.

In some embodiments, the security device may contain the memory for storing the secret items, whereby the data items are backed up to the device itself. In other embodiments, however, the security device may include a memory device interface for connecting the security device to a memory device containing the memory for storing the secret data items. In this case, the secret data items are backed up to the memory device which may be subsequently disconnected and kept separately from the security device. In any case, the memory in question is ideally protected against illegal reading by some form of security mechanism, for example by incorporation in an embedded tamper-resistant chip, which is protected by a user PIN (personal identification number). A particularly convenient form factor for the memory device is a smart card, the security device then incorporating a (wired or wireless) smart card interface for connection to the smart card when required.

The security device itself may take a variety of forms but is most conveniently a small, portable device which can easily be carried by the user for connection to a user computer when required. The computer interface of the device may in general comprise any convenient form of wired or wireless interface. However, a convenient form factor is small device resembling a memory stick which has a USB (universal serial bus) connector whereby the device can be plugged into a USB port of the user computer. In any case, to avoid the need to incorporate intrusion detection mechanisms to prevent interference by malicious software, the device is ideally non-programmable by extraneous program code. That is, the device is adapted such that extraneous program code cannot be loaded to the device processing logic. While some facility might be provided to allow amendment or updating of device programming by authorised parties (e.g. via the secure connection in operation of the device), the device should not incorporate general-purpose computing functionality or otherwise permit unauthorized programming by extraneous software.

As described above, the device control logic is adapted to interact with the user via the user interface to obtain authorization for backup and restore operations. For this purpose, the user interface comprises at least one, and preferably both, of a user input mechanism and a user output mechanism. In preferred embodiments the user interface comprises at least a display, although an audio output mechanism could be envisaged in addition or as an alternative. Preferred embodiments additionally include an input mechanism such as one or more buttons for input of user authorization. Alternatives can be envisaged however. For example, the control logic could conceivably implement a "time-out" system for user authorization, whereby failure to disconnect the security device (e.g. by unplugging from the user computer) within a predetermined time from an output authorization request is deemed to imply user authorization. Positive user input is, however, preferred to indicate authorization.

Secret data items to be backed up by the security device are typically received from the server in response to some form of request sent to the server, e.g. input by the user via the user computer. At any given time, the server might send all, some or only individual data items, e.g. in response to an appropriate request. The order in which individual operations are performed by the control logic can vary in different embodiments or operational instances. For example, the control logic might receive data items from the server before requesting backup authorisation from the user, e.g. one item at a time, or authorization might be obtained before requesting data items from the server. For instance, the user could indicate authorization for a backup operation to be performed, whereupon the control logic then requests and stores all data items from the server. Where a data item is received by the device before backup authorisation is obtained, then that item will only be stored for backup purposes (i.e. maintained in device memory for subsequent retrieval or transferred to secure memory where appropriate) if backup authorisation is given.

The device control logic may be adapted to facilitate other data item management operations as well as the backup and restore operations. In particular, the control logic may be adapted to interact with the user via the user interface to obtain user authorization to process a secret data item in accordance with a predetermined management operation and, in response, to process the secret data item accordingly. Examples of such further operations will be described below.

A second aspect of the invention provides apparatus for facilitating management of secret data items used by a remote server to authenticate operations of the server. The apparatus comprises a user computer for communication with the remote server via a data communications network, and a security device according to the first aspect of the invention for connection to the user computer via said computer interface of the device.

A third aspect of the invention provides a system comprising a server storing secret data items for authenticating operations of the server, and apparatus according to the second aspect of the invention for facilitating management of the secret data items via a data communications network.

A fourth aspect of the invention provides a computer program including program code means for causing a processor of a security device according to the first aspect of the invention to perform a method for facilitating management of secret data items which are used by a remote server to authenticate operations of the server. The method includes establishing between the device and remote server, via the user computer, a mutually-authenticated connection for encrypted end-to-end communications between the device and server, receiving the secret data items from the server via the connection, interacting with the user via the user interface to obtain user authorization to backup secret data items and, in response, storing the secret data items in memory accessible to the processor in use; and interacting with the user via the user interface to obtain user authorization to restore secret data items and, in response, sending the secret data items to the server via the connection.

The processor which is configured by such a computer program may in general include one or more processing chips or cores. Moreover, a computer program embodying the invention may constitute an independent program or may be an element of a larger program, and may be supplied, for example, embodied in a computer-readable medium such as a disk or an electronic transmission for loading in a security device. The program code means of the computer program may comprise any expression, in any language, code or notation, of a set of instructions intended to cause the processor to perform the method in question, either directly or after either or both of (a) conversion to another language, code or notation, and (b) reproduction in a different material form.

In general, where features are described herein with reference to an embodiment of one aspect of the invention, corresponding features may be provided in embodiments of another aspect of the invention.

BRIEF DESCRIPTION OF THE DRAWINGS

Preferred embodiments of the invention will now be described, by way of example, with reference to the accompanying drawings in which.

DETAILED DESCRIPTION OF THE INVENTION

Figure 1:
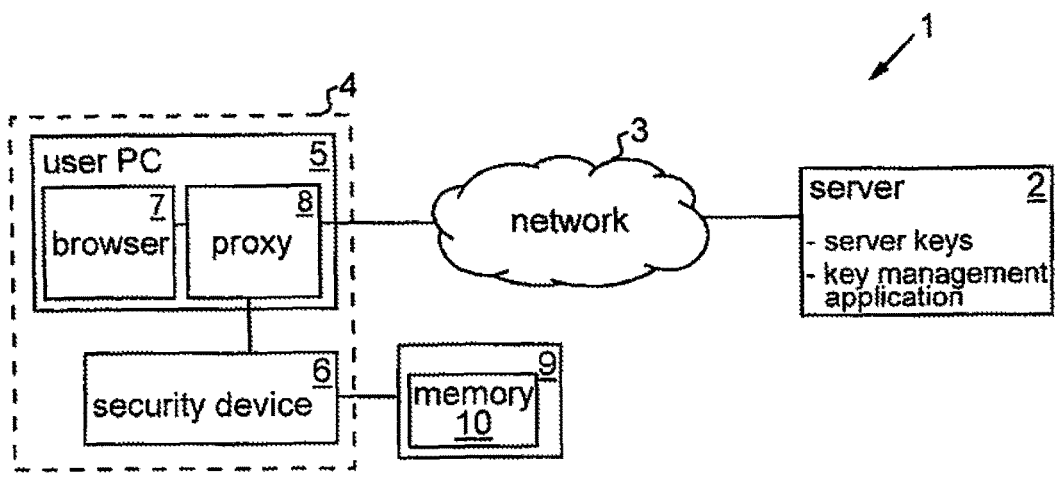
FIG. 1 is a schematic representation of a data communication system embodying the invention.

FIG. 1 shows a data communications system 1 embodying the invention. The system 1 includes a server 2 which can communicate with other computers via a data communications network 3. Network 3 may in general comprise one or more component networks or internetworks. In this example, it is assumed that network 3 comprises the Internet and that server 2 provides various security-sensitive services to users who connect to the server over the Internet from remote user computers. By way of example, server 2 may host various applications providing on-line banking services to connecting users. To authenticate communications sent by the server in operation (i.e. to prove that a communication was sent by the genuine server 2), a cryptographic encryption/decryption system using non-symmetric (public/private) key pairs is employed in known manner. Thus, server 2 can encrypt an outgoing communication using the private key of a public/private key-pair. This private key is secret to the server 2. If a recipient can decrypt the communication using the (non-secret) public key of the key pair, this authenticates the communication as having been encrypted by the genuine server 2 which holds the secret, private key. Server 2 typically holds multiple such keys, e.g. different keys for respective applications running on the server and/or different keys for use with different connecting users or user-groups.

Each key has associated metadata, in particular a unique key name or other id for convenient identification of individual keys. In addition, key metadata typically includes a checksum calculated over the bytes of key itself. Server 2 also hosts a key management application for management of the server keys by a system administrator as described further below.

To facilitate management of the server keys from a location remote from server 2, the system 1 includes apparatus, indicated generally at 4, comprising a user computer 5 and a security device 6. User computer 5 here is a general-purpose PC, having a resident web browser application 7 allowing connection to remote server 2 via the Internet 3. The security device 6 can be connected to PC 5 as described below. Once connected, a proxy application 8 can be loaded from the security device 6 to PC 5. Proxy application 8 resides logically between browser 7 and Internet 3 and conveys communications to and from security device 6 as described in more detail below. The security device 6 is also connectable to a memory device 9 containing memory 10 for backup storage of server keys as described below.

Figure 2:
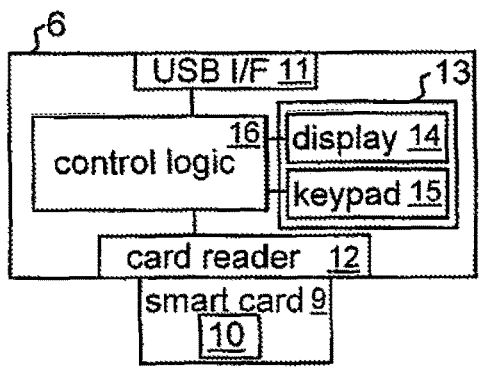
FIG. 2 is a more detailed illustration of a security device of the FIG. 1 system.

FIG. 2 is schematic block diagram of the security device 6 showing the main elements of the device in more detail. The device 6 of this embodiment is a small portable device resembling a memory stick and having a computer interface, here a USB interface 11, for connecting the device to user computer 5. The security device 6 has a slot for insertion of a memory device 9 in the form of a smart card. When the card is inserted, the device 6 can interface with the smart card chip, containing memory 10, via card reader interface 12. In this embodiment, smart card memory 10 contains pre-stored security data for use in establishing the secure connection to server 2 as discussed below. The security device also includes a user interface 13 comprising a display 14 and a keypad 15. Keypad 15 comprises one or more buttons, and ideally provides a scrolling mechanism for display 14, enabling user input to the device as described below. Control logic 16 controls operation of the device generally and implements the various steps of the key management operations described below. In general, control logic 16 could be implemented in hardware, software or a combination thereof but in this example the logic 16 is implemented by software which configures a processor of device 6 to perform the functions described. Suitable software will be apparent to those skilled in the art from the description herein. In this embodiment, control logic 16 implements a file system whose files (stored in internal device memory, not shown separately, associated with the control logic) include an executable file for the proxy application 8. The processor implementing control logic 16 is designed such that extraneous program code cannot be loaded to the processor, thereby preventing programming of the device by additional, unauthorised code. This can be achieved, for example, by fusing the program memory of the processor after initial programming.

In operation, a system administrator can perform management operations for keys held by server 2 by interacting with the server via the browser 7 of any convenient local user computer 5. Web pages downloaded from server 2 are displayed in the browser window, allowing the user to interact in the usual manner with the key management application on server 2.

However, the security device 6 allows the administrator to perform key management in a secure manner. In particular, when the administrator wishes to perform a key management operation, he first connects the security device 6 to PC 5 via USB interface 11. The control logic 16 of the device then performs a setup procedure the main steps of which are indicated in the flow diagram of FIG. 3.

Figure 3:
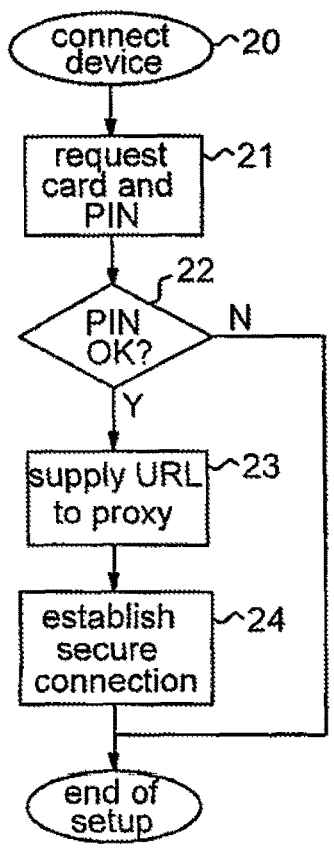
FIG. 3 indicates a setup procedure performed by the security device of FIG. 2.

Connection of the device 6 to PC 5 is represented by step 20 in FIG. 3. Next, in step 21 of this embodiment, the control logic 16 prompts the administrator by message on display 14 to insert smart card 9 into the card interface 13 of the device and to enter his PIN using keypad 15. The correct administrator PIN is stored as part of the security data on smart card 9 in this example, and the number entered by the user is checked against that stored on the card. This procedure protects against unauthorized use of a lost or stolen card and security device. Control logic 16 may give the user a number of opportunities to enter the correct PIN, but if no valid PIN is entered (N at decision 22) the process will terminate. Assuming, however, that the PIN is valid (Y at decision 22), then operation will proceed to step 23. Initial connection of the device 6 to PC 5 via USB interface 11 triggers the USB protocol which makes the device visible to PC 5 as a so-called mass storage device, having a file system as mentioned above. The only file in this file system which is accessible to the user is the proxy application 8. The user can start the proxy from PC 5, either manually by finding and starting the executable file, or by responding to an auto-start feature of the PC operating system which automatically recognises the proxy file and offers to start it for the user. In any case, the proxy application 8 is loaded from device 6 to PC 5, and in step 23 of FIG. 3 the control logic 16 supplies the URL of server 2 to the proxy application. In this embodiment, the server URL is stored as part of the security data on smart card 9 and is therefore accessible to control logic 16 once the card 9 has been "unlocked" by correct PIN entry at step 22. Proxy application 8 then starts the browser 7 on PC 5, thus initiating the connection to server 2 at the URL supplied by control logic 16. As indicated in step 24, the control logic establishes, with the help of proxy 8, a mutually-authenticated connection for encrypted end-to-end communications between the device 6 and server 2. The data necessary for establishing this connection forms part of the security data stored on smart card 9 in this example. This data typically comprises a secret cryptographic key (or key-pair) for use in the authentication process, as well as trusted TLS/SSL (Transport Layer Security/Secure Sockets Layer) certificates and possibly additional user information such as user name, etc. The secret key (or key-pair) is used for encryption/decryption of messages enabling mutual authentication of the device 6 and server 2, and a TLS/SSL connection is established with server 2 by implementing the protocol setup in known manner. The TLS/SSL connection is end-to-end between the device 6 and the server 2 selected for this session according to the security data on smart card 9. Once the secure connection has been established in step 24, the setup procedure is complete.

Figure 4:
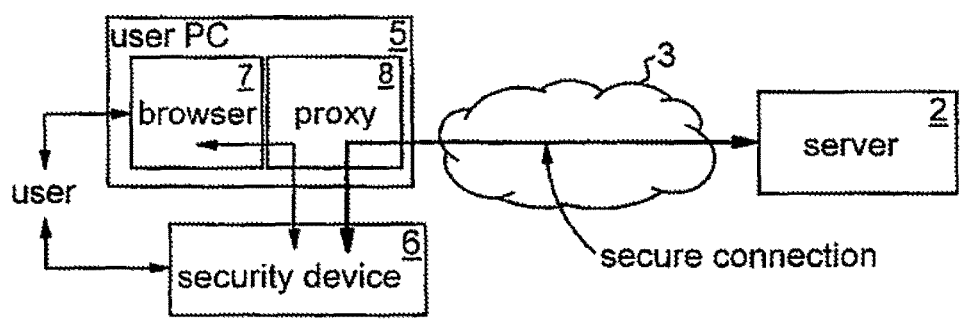
FIG. 4 indicates communication paths in operation of the FIG. 1 system.

FIG. 4 indicates the communications paths in system 1 during performance of the ensuing key management operations. The secure connection between security device 6 and server 2 is indicated by the bold line in the figure. Since this connection is end-to-end between the device and server, proxy 8 simply conveys network packets blindly between the two.

Communications from the server to browser 7 can be forwarded by security device 6, via proxy 8, to the browser after removal of any security sensitive information, in particular key-bytes, as discussed below. Similarly, all communications from browser 7 to server 2 are relayed by proxy 8 to security device 6. Security device 6 can then add security-sensitive information to the flow as discussed below and forward packets on to server 2 via the secure connection. The user can interface with both user PC 5 and security device 6 during the management process as indicated in the figure.

It will be seen from FIG. 4 that all communications between server 2 and browser 7 are relayed via the security device 6. The control logic 16 monitors the flows and can detect specific content and then react in the appropriate manner for the key management processes to be described. This flow monitoring process can be implemented simply by an HTTP (hypertext transfer protocol) parser and appropriate parsing profile in control logic 16 as will be apparent to those skilled in the art. Various management operations in which the security device performs critical security operations will be described below with reference to FIGS. 5 and 6.

The first management operation to be described is the creation of backup copies of server keys so that these can be restored to the server if necessary. The administrator can select the backup function of the server management application by interacting with the application's user interface via browser 7 of PC 5. When so prompted, server 2 displays the key id's of its current keys (and if desired additional key metadata such as key checksums) via browser 7. (This operation can be restricted by the administrator's access privilege as established during the session authentication). The administrator can then select a key id and instruct the backup operation. In response, server 2 sends the key and associated metadata, and this is received by security device 6 via the secure connection. The control logic 16 identifies the key-export in the HTTP response from server 2 and initiates the key-backup operation. The main steps of this operation are indicated in the flow chart of FIG. 5.

Figure 5:
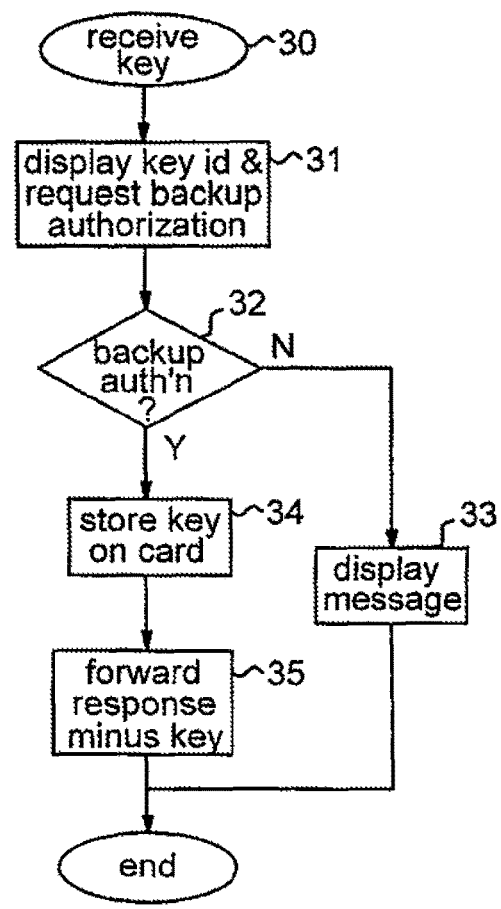
FIG. 5 illustrates a key backup operation performed by the security device of FIG. 2.

Initiation of the backup operation on receipt of the exported key is represented by step 30 in FIG. 5. In step 31, the control logic 16 then parses the key metadata and displays the key id (and, if desired, the key checksum) on device display 14 with a message prompting the user to authorize the key backup. The user can indicate authorization by pressing an appropriate button on device keypad 15. If backup authorisation is not given (N at decision step 32), then in step 33 the control logic can simply display a message to this effect on display 14 and the backup operation terminates. Refusal of authorization might be indicated by explicit user input via keypad 15 and/or might be assumed by control logic 16 if no explicit authorisation is given within a predetermined time interval. If backup authorization is obtained at step 32, the control logic responds by storing the key and associated metadata in memory 10 of smart card 9 via card interface 12. The control logic then deletes the actual key-bytes from the original HTTP response received from server 2, depositing a placeholder (blank data) in their place, and forwards the response on to browser 7 via proxy 8. The response can thus be displayed on PC 5 without the key itself ever being exposed to PC 5. Indeed, the key itself is never displayed in the open, even by security device 6, during the backup operation.

The administrator can progress through the available server keys, creating backup copies of those required via the process described above. The backup keys are thus stored in secure memory 10 on smart card 9. This card can then be removed from device 6 and kept by the administrator for convenient access when subsequently required. In particular, if the administrator subsequently needs to restore a key to server 2, e.g. following device failure or system overhaul, then the following procedure can be performed.

After setting up the security device and accessing the server 2 via a user PC 5 as already described, the administrator instigates display of the key ids for keys stored on smart card 9. This may be done by input of a predetermined command via device keypad 15, the control logic responding by accessing memory 10 and retrieving the key ids. Key ids (and associated metadata such as checksums if desired) may be displayed directly on device display 15 allowing scrolling by the user. Alternatively, or in addition, stored key ids may be sent by control logic 16 to browser 7 for display to the user on PC 5. The administrator can select the id of a key to be restored by the appropriate interface, and instruct the key-restore operation by interacting with the server management application via browser 7. The resulting HTTP request from browser 7 contains a payload which is annotated to indicate the key-restore request and includes a placeholder in place of the actual key-bytes which are not known to the browser. The request may include the key id and checksum of the selected key if available to the browser. The HTTP stream is received and parsed by control logic 16 of security device 6 which identifies the key-restore request. The main steps of the ensuing key-restore operation are indicated in the flow diagram of FIG. 6.

Figure 6:
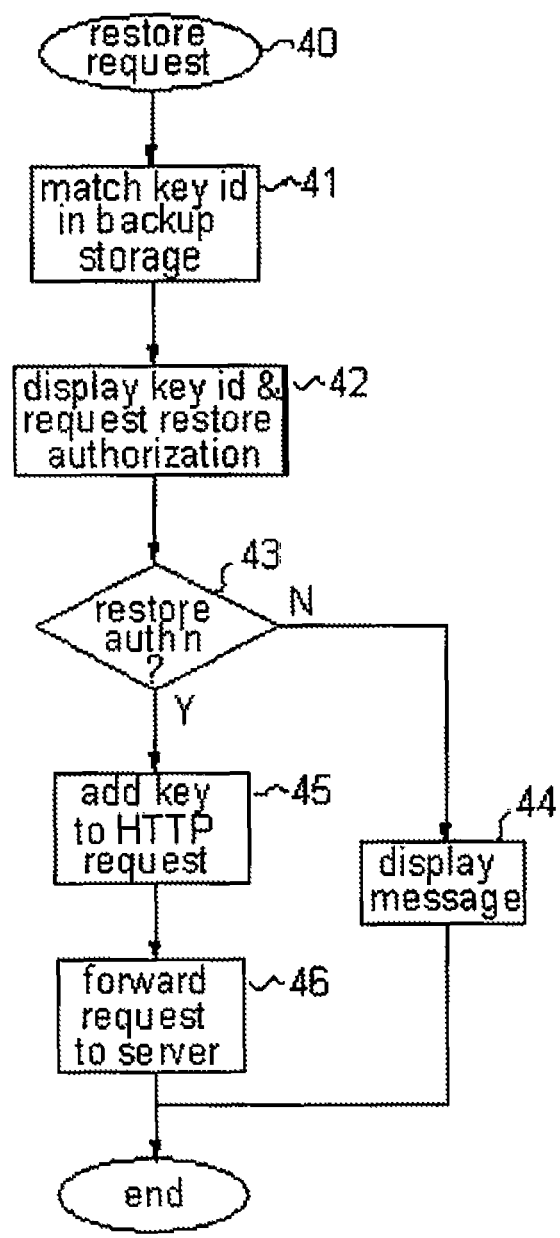
FIG. 6 illustrates a key restore operation performed by the security device of FIG. 2.

Receipt of the key-restore request by control logic 16 is represented by step 40 of FIG. 6. The key id for the key to be restored is retrieved by control logic 16 which then checks in step 41 for a matching id in memory 10. (The key checksum, if available, can also be checked to confirm a match in this step). Having identified the key to be restored in backup memory 10, in step 42 the control logic displays the key id (and, if desired, the key checksum) on device display 14 with a message prompting the user to authorize the key-restore operation by input to keypad 15. If restore authorisation is not obtained (N at decision step 43), then in step 44 the control logic displays a message to this effect on display 14 and the restore operation terminates. If restore authorization is obtained from the user at step 43, the control logic responds in step 45 by replacing the placeholder in the HTTP request with the actual key-bytes from backup store 10. In step 46, the control logic then forwards the HTTP request via the secure connection to server 2 which stores the key for future use. The restore operation is then complete. Again, the key itself is never exposed to user PC 5 and never displayed in the open, even by security device 6, during the restore operation.

The administrator can restore multiple server keys by repeating the process described above. The smart card 9 can then be removed from device 6 and kept as before.

The security device can of course be employed in a similar manner to facilitate additional key management operations, such as deletion, replacement or renaming (changing the key id) of keys. For such operations, control logic 16 can interact with the user via user interface 13 to obtain user authorization to process a key in the required manner, only performing the requested operation in response to appropriate authorization. Again, user interaction via browser 7 can be exploited to facilitate these operations, e.g. by providing browsing options for these functions, while actual key-bytes need never be exposed to PC 5 or network 3. Operations are always authorised by user confirmation using display 14 and keypad 15.

It will be seen that the system described allows secure management of remote server keys, including secure key backup and restoration operations. These operations can be conducted over an insecure network 3 and via any convenient, potentially untrustworthy, user computer 5. The operation of security device 6 ensures that all key-bytes passing through network 3 and PC 5 are encrypted and that malware infecting PC 5 cannot take control of secure operations. The system can nevertheless be implemented in a simple manner, requiring only conventional browser operation on user computer 5 and relatively simple functionality in security device 6. Existing server management applications can be easily adapted for more convenient operation in the above system by only minor modification, e.g. changing a few web pages. The functionality of control logic 16 in the embodiment described also allows the security of smart card 9 to be exploited without requiring smart-card infrastructure changes. Overall, therefore, the integration effort required for system implementation is minimal.

While an exemplary embodiment has been described above, many changes and modifications can be envisaged. Some examples are set forth below.

While backup memory 10 is provided on smart card 9 which also carries the security data (connection key, user PIN, etc.) in this example, in other embodiments the backup memory 10 and/or security data may be contained in the security device itself. The security data, for example, could be contained in a secure chip which is embedded in the device and physically-protected against tampering, using self-destructing data containers or intrusion detection sensors for example.

For simplicity of explanation, operation of the above embodiment has been described for a single server 2, the URL and credential for this server (the server certificate) being stored on smart card 9 in this case. In general, however, the security device may be used for managing one or more servers, and the server access data may be stored in a smart card (or other memory device) or in the security device itself. For example, the URL and server certificate(s) could be programmed in the security device 6 when it is manufactured. In the case of key management for multiple servers, multiple <URL, credential> pairs, each with an identifying name, could be pre-stored in the device, and the startup process could allow the user to select the desired server name from a list. Alternatively, for example, a starting URL pointing to a page with a list of servers that can be managed by an administrator could be stored in the security device (or memory device). This would allow the user to select a particular server on the browser. The advantage of this approach is that the user would have a very natural way of selecting the server, i.e. via the browser and a list of server links to click on. Since the PC 5 cannot be trusted, the user's choice of server would have to be authorized via user interface 13 of the security device (e.g. by displaying a message "Connect to server XXXX. OK?"). The credential corresponding to the selected server would still have to be available to the security device. The credentials here could be pre-stored in the security device or memory device. Alternatively, it would be possible to store a single credential on the security (or memory) device for an Intermediate Server where the individual server certificates are stored. In this case, when a server is selected, the security device would first securely connect to the Intermediate Server, and then obtain the credential for the required server. This would be a particularly scalable and flexible approach for management of multiple servers. Suitable modifications to the setup procedure of FIG. 3 in these cases, including the most appropriate stage for PIN entry, will be readily apparent to those skilled in the art.

While backup and restore operations are performed key by key, each requiring user authorization, in the above example, the functionality can be easily adapted to allow operations to be performed on groups of keys, or even all available keys, if desired. Of course, while operation has been described with particular reference to private server keys, the system can of course be applied to other secret data items, including symmetric cryptographic keys, passwords, or other similar security tokens used for server authentication.

Although server 2 is shown as a single entity above, in general the functionality of server 2 could be distributed over a plurality of physical machines of a server system. User computer 5 might also be implemented by a variety of other computing devices, such as PDAs (personal digital assistants), mobile phones, etc., which are capable of data communications with server 2 via network 3. Further, while an especially convenient web-based implementation has been described, client software other than the conventional browser and proxy applications described might be envisaged for use on user computers 5 in different applications and for use over networks other than the Internet.

The security device itself could take a variety of forms, and the device's computer interface and memory device interface (where provided) could be implemented in general by any convenient form of wired or wireless connection. The user interface could also be implemented in a variety of ways, and might provide acoustic prompts to users and/or present visual information via a variety of display mechanisms, e.g. utilizing a laser projection display.

It will be appreciated that many other changes and modifications can be made to the exemplary embodiments described without departing from the scope of the invention.

The invention claimed is:

1. A method comprising:
    providing a zone trusted information device that includes a universal serial bus (USB) connector, a processor, a data storage device and zone trusted information software;
    connecting, in data communication, a computer device to a data communication network;
    connecting, in data communication, the computer device to the zone trusted information device through the USB connector of the zone trusted information device;
    establishing, over the data communication network between a remote server and the zone trusted information software running on the processor of the zone trusted information device, a direct secure sockets layer (SSL) data communication connection;
    receiving, through the direct SSL data communication connection, from the remote server and by the zone trusted information software running on the processor of the zone trusted information device, a backup of server keys to a set of application(s) running on an untrusted platform; and
    storing the backup of server keys to the set of application(s) running on the untrusted platform in the data storage device of the zone trusted information device.

2. The method of claim 1 further comprising: accessing the backup of server keys from the zone trusted information device to establish security with respect to the set of application(s) running on the untrusted platform.

3. The method of claim 1, wherein the zone trusted information device is in the form of a USB stick.

4. A security device comprising:
    a zone trusted information device that includes a universal serial bus (USB) connector, a processor, a data storage device and zone trusted information software;
    a computer device in data communication with the zone trusted information device through the USB connector, the computer device also in data communication with a data communication network; and,
    zone trusted information software running on the processor of the zone trusted information device and performing:
    establishing, over the data communication network between a remote server and the zone trusted information software, a direct secure sockets layer (SSL) data communication connection;
    receiving, through the direct SSL data communication connection, from the remote server and by the zone trusted information software running on the processor of the zone trusted information device, a backup of server keys to a set of application(s) running on an untrusted platform; and
    storing the backup of server keys to the set of application(s) running on the untrusted platform in the data storage device of the zone trusted information device.

5. The system of claim 4, wherein the zone trusted information software further performs:
    accessing the backup of server keys from the zone trusted information device to establish security with respect to the set of application(s) running on the untrusted platform.

6. The system of claim 4, wherein the zone trusted information device is in the form of a USB stick.

7. A computer program stored in a non-transitory computer readable storage medium, the computer program comprising program code for causing a processor of a security device to perform a method comprising:
    providing a zone trusted information device that includes a universal serial bus (USB) connector, a processor, a data storage device and zone trusted information software;
    connecting, in data communication, a computer device to a data communication network;
    connecting, in data communication, the computer device to the zone trusted information device through the USB connector of the zone trusted information device;
    establishing, over the data communication network between a remote server and the zone trusted information software running on the processor of the zone trusted information device, a direct secure sockets layer (SSL) data communication connection;
    receiving, through the direct SSL data communication connection, from the remote server and by the zone trusted information software running on the processor of the zone trusted information device, a backup of server keys to a set of application(s) running on an untrusted platform; and storing the backup of server keys to the set of application(s) running on the untrusted platform in the data storage device of the zone trusted information device.

8. The computer program product of claim 7, wherein the method further comprises:

accessing the backup of server keys from the zone trusted information device to establish security with respect to the set of application(s) running on the untrusted platform.

9. The computer program product of claim 7, wherein the zone trusted information device is in the form of a USB stick.

* * * * *